United States Patent [19]

Varshney et al.

[11] Patent Number: 5,264,527
[45] Date of Patent: Nov. 23, 1993

[54] ACRYLIC TRIBLOCK COPOLYMERS, THEIR PREPARATION AND THEIR APPLICATION TO THE MANUFACTURE OF ELASTOMERIC ARTICLES

[75] Inventors: Sunil K. Varshney, Liege; Roger Fayt, Neupre; Philippe Teyssie, Neuville-en-Condroz; Jean-Paul Hautekeer, Liege, all of Belgium

[73] Assignee: Elf Atochem S.A., Paris, France

[21] Appl. No.: 777,405

[22] PCT Filed: May 7, 1990

[86] PCT No.: PCT/FR90/00514

§ 371 Date: Dec. 11, 1991

§ 102(e) Date: Dec. 11, 1991

[87] PCT Pub. No.: WO91/00874

PCT Pub. Date: Jan. 24, 1991

[30] Foreign Application Priority Data

Jul. 10, 1989 [FR]   France ................. 89 09268
Nov. 27, 1989 [FR]   France ................. 89 15581

[51] Int. Cl.$^5$ ................. C08F 293/00; C08F 297/02
[52] U.S. Cl. ................................. 525/299; 525/280
[58] Field of Search ....................... 525/280, 299

[56] References Cited

U.S. PATENT DOCUMENTS 3,287,298  11/1966  D'Alelio ........................ 260/23

FOREIGN PATENT DOCUMENTS 0274318  7/1988  European Pat. Off. .......... 525/299

OTHER PUBLICATIONS

Chemical Abstracts; 84:136297u; Fukawa et al.

*Primary Examiner*—James J. Seidleck
*Assistant Examiner*—W. R. H. Clark
*Attorney, Agent, or Firm*—Finnegan, Henderson, Farabow, Garrett & Dunner

[57] ABSTRACT

Triblock copolymers containing a copolymer having a number-average molecular weight of from 3,000 to 300,000, a molecular weight polydispersity of from 1.05 to 2.0, and an A-B-C structure in which each of the blocks A and C may be a monomer sequence chosen from an acrylic, a vinylaromatic, a methacrylic or a maleimide monomer, and block B may be a monomer sequence chosen from an acrylic, a vinylaromatic or a methacrylic monomer, where at least one of the blocks A and C is different than block B.

10 Claims, No Drawings

ACRYLIC TRIBLOCK COPOLYMERS, THEIR PREPARATION AND THEIR APPLICATION TO THE MANUFACTURE OF ELASTOMERIC ARTICLES

The present invention relates to new triblock copolymers containing at least one acrylic block, and more particularly to such copolymers obtained by anionic polymerisation. The present invention also relates to a process for obtaining such copolymers, and more particularly to a process allowing their polydispersity to be controlled, and to the application of these triblock copolymers to the manufacture of elastomeric articles.

Triblock copolymers combining alkyl methacrylate blocks of different kinds are already known. Thus, Polymer Preprints 29(1), pages 343-345 describes triblock copolymers (tert-butyl methacrylate-b-2-ethylhexyl methacrylate-b-tert-butyl methacrylate) obtained by anionic polymerisation in tetrahydrofuran at $-78°$ C. in the presence of a difunctional initiator. Using this method, block copolymers are obtained which may contain up to 20% by weight of tert-butyl methacrylate but which have a relatively broad molecular weight distribution. Furthermore, the combination of different methacrylates in a triblock copolymer of this type does not appear to be capable, even after hydrolysis and/or in subsequent neutralisation of the ester functional groups, of imparting to this copolymer properties which make it suitable for a particular application. On the other hand, provided that the copolymer has a narrow molecular weight distribution, the combination of acrylate blocks and methacrylate or else vinylaromatic blocks in a triblock copolymer seems capable of providing advantageous properties in a number of types of applications, and especially for the manufacture of elastomeric articles.

U.S. Pat. No. 3,287,298 describes a class of polymers which can be converted in air at ordinary temperature, that is to say of fusible and/or soluble polymers which, on exposure to oxygen, are converted into insoluble polymers by virtue of the presence of multiple unsaturated groups in their structures. This class includes block copolymers of formula:

in which
$n_o$ is an integer equal to at least 4, m is an integer equal to at least 1 and capable of reaching up to the value of $n_o$,
A is a monomer of formula

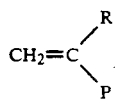

in which R is chosen from H, $CH_3$ and CN, and P may be, among others, an aryl radical or a group $CO_2R$, in which R' is chosen from aromatic, saturated aliphatic and saturated cycloaliphatic radicals containing up to 12 carbon atoms, and
B is a monomer of formula

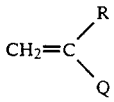

in which R is chosen from H, $CH_3$ and CN, and Q is an unsaturated aliphatic radical containing from 16 to 24 carbon atoms.

By virtue of their property of convertibility in air, these block copolymers are particularly useful for coating applications such as varnishes, paints, and the like.

The problem which the present invention aims to solve consists in developing a polymerisation process for obtaining triblock copolymers containing at least one acrylic block and having a narrow molecular weight distribution, and capable of having properties which enable them to be employed in the manufacture of elastomeric articles. The present invention is based on the surprising discovery that this objective can be reached by combining, in the system for initiating the anionic polymerisation, the initiator with a ligand such as an alkali or alkaline-earth metal salt, by conducting the polymerisation sequentially and preferably by selecting the relative proportions of the acrylic and nonacrylic polymers which are involved.

A first subject of the present invention consists of a triblock copolymer which has a number-average molecular weight ranging approximately from 3,000 to 300,000 and a molecular weight polydispersity ranging approximately from 1.05 to 2.0, of A-B-C structure in which each of the blocks A and C denotes a monomer sequence chosen from the classes of acrylic, vinylaromatic, methacrylic and maleimide monomers, block B denotes a monomer sequence chosen from the classes of acrylic, vinylaromatic and methacrylic monomers, with the condition that at least one of the blocks A and C is chosen from a class other than that of block B.

A vinylaromatic monomer within the meaning of the present invention means an aromatic monomer containing ethylenic unsaturation, such as styrene, vinyltoluene, alpha-methylstyrene, 4-methylstyrene, 3-methylstyrene, 4-methoxystyrene, 2-hydroxymethylstyrene, 4-ethylstyrene, 4-ethoxystyrene, 3,4-dimethylstyrene, 2-chlorostyrene, 3-chlorostyrene, 4-chloro-3-methylstyrene, 3-tert-butylstyrene, 2,4-dichlorostyrene, 2,6-dichlorostyrene and 1-vinylnaphthalene.

An acrylic monomer within the meaning of the present invention means a monomer chosen from acrylic acid, alkali metal acrylates, acrylonitrile, dialkylacrylamides and the acrylates of formula $CH_2=CH-CO_2R$ in which R is chosen from aryl, alkoxyalkyl, alkylthioalkyl, linear or branched alkyl (primary, secondary or tertiary) and cycloalkyl radicals containing from 1 to 18 carbon atoms, substituted, if appropriate, by one or more halogen atoms. As examples of such acrylates, the methyl, ethyl, n-propyl, isopropyl, n-butyl, sec-butyl, tert-butyl, hexyl, 2-ethylhexyl, isooctyl, 3,3,5-trimethylhexyl, lauryl, stearyl, cyclohexyl, phenyl, isobornyl, methoxymethyl, methoxyethyl, ethoxymethyl and ethoxyethyl compounds may be mentioned in particular.

A methacrylic monomer within the meaning of the present invention means a monomer chosen from methacrylic acid, alkali metal methacrylates, methacrylonitrile, dialkylmethacrylamides and the methacrylates of formula

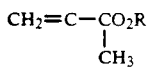

in which R is defined as above. As examples of such methacrylates, the methyl, ethyl, 2,2,2-trifluoroethyl, n-propyl, isopropyl, n-butyl, sec-butyl, tert-butyl, n-amyl, isoamyl, hexyl, 2-ethylhexyl, cyclohexyl, octyl, isooctyl, decyl, benzyl and norbonyl compounds may be mentioned in particular.

A maleimide within the meaning of the present invention means preferably an N-substituted maleimide of formula:

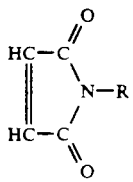

in which R is an alkyl, arylalkyl, aryl or alkylaryl radical containing from 1 to 12 carbon atoms. Examples of such molecules are especially N-ethylmaleimide, N-isopropyl maleimide, N-n-butylmaleimide, N-isobutylmaleimide, N-tert-butylmaleimide, N-n-octylmaleimide, N-cyclohexylmaleimide, N-benzylmaleimide and N-phenylmaleimide.

In the triblock copolymers according to the invention, blocks A and C may be chosen from the same single class of monomers always on condition that this is other than the class of monomers constituting block B. Thus, among the block copolymers according to the invention the following classes are to be found:
methacrylic-b-acrylic-b-methacrylic,
acrylic-b-vinylaromatic-b-acrylic,
methacrylic-b-vinylaromatic-b-methacrylic,
vinylaromatic-b-acrylic-b-vinylaromatic,
vinylaromatic-b-acrylic-b-methacrylic,
acrylic-b-vinylaromatic-b-methacrylic,
vinylaromatic-b-methacrylic-b-acrylic,
acrylic-b-methacrylic-b-acrylic,
maleimide-b-acrylic-b-maleimide, and
maleimide-b-methacrylic-b-maleimide.

In the triblock copolymers according to the invention, blocks A and B which are situated at chain ends may be oligomer blocks, that is to say blocks consisting of a very small number (for example as small as 3) of monomer units of the class in question. They may also consist of a large number of such units and may then have a molecular weight of tens of thousands. When blocks A and C are of identical nature they may consist of the same number of repeat units of the monomer in question, particularly when they are prepared by the process which is referred to hereinafter as the "second process". In this latter case the middle block B may commonly represent approximately from 10 to 99% by weight of the total copolymer. When the triblock copolymers according to the invention are to be employed in the manufacture of elastomeric articles it is preferable that the middle block B should consist of a soft monomer such as an acrylic monomer and more particularly a primary alkyl or alkoxyalkyl acrylate, that the end blocks A should consist of a hard monomer such as a methacrylic monomer and that the middle block B should represent approximately from 50 to 85% by weight of the total copolymer.

The triblock copolymers according to the invention can be obtained by a first process characterised in that:
(1) an anionic polymerisation of at least one monomer A is conducted with the aid of an initiating system consisting of at least one monofunctional initiator of formula:

in which:
M denotes an alkali or alkaline-earth metal,
p denotes the valency of the metal M, and
R denotes a straight- or branched-chain alkyl radical containing 2 to 6 carbon atoms, or an alkyl radical containing 1 to 6 carbon atoms, substituted by at least one phenyl group, and at least one ligand chosen from alkali or alkaline-earth metal salts, to obtain a living chain unit $A^-$, then
(2) the said living chain unit is reacted with at least one monomer B to obtain a living diblock copolymer $(A\text{-}B)^-$, then
(3) the said copolymer $(A\text{-}B)^=$ is reacted with at least one monomer C to form a living triblock copolymer $(A\text{-}B\text{-}C)^-$, and finally
(4) the copolymer $(A\text{-}B\text{-}C)^-$ is reacted with at least one protolytic compound.

By way of example, this first subject can be implemented simply by placing the initiating system—consisting of the monofunctional initiator and of the ligand—in a reactor and by then successively introducing into the said reactor the monomer A, the monomer B and the monomer C, each polymerisation stage preceding the introduction of the following monomer, and finally by terminating the polymerisation by adding a protolytic compound.

The initiators of formula (I) which are employed in stage (1) are, for example, sec-butyllithium, n-butyllithium and alphamethylstyryllithium, 1,1-diphenylhexyllithium, diphenylmethyllithium or sodium or potassium and 1,1-diphenyl-3-methylphenyllithium. The ligand may be chosen from, on the one hand, inorganic salts of alkali or alkaline-earth metals, for example chlorides, fluorides, bromides, iodides, borides, sulphates, nitrates and borates and, on the other hand, organic salts of alkali metals, such as, for example, alcoholates, esters of carboxylic acids substituted by the said metal in the α position, and compounds in which the said metal is associated with a group such as, (A) the groups of formula:

in which $R_1$ is a linear or branched alkyl radical containing from 1 to 20 carbon atoms, or else a cycloalkyl radical containing from 3 to 20 carbon atoms, or, again, an aryl radical containing from 6 to 14 carbon atoms, (B) the groups of formula:

in which:

Y and Z, which are identical or different from each other, are chosen from a hydrogen atom and halogen atoms, n is an integer ranging from 0 to 4, X is a halogen atom, and m is an integer ranging from 0 to 2, (C) the groups of formula:

$$O-SO_2-CT_3 \qquad (IV)$$

in which T is chosen from a hydrogen atom and halogen atoms, and (D) the groups of formula:

$$B(R_2)_4 \qquad (V)$$

in which $R_2$ is chosen from a hydrogen atom and alkyl and aryl radicals.

Examples of groups of formula (II) are the acetate, propionate and benzoate groups. Examples of groups of formula (III) are the α-bromoacetate and trifluoroacetate groups. Examples of groups of formula (IV) are the trifluormethane sulphonic and methanesulphonic groups. Examples of group (V) are the borohydride and tetraphenylboride groups.

When the blocks A and C are of identical kind the triblock copolymers according to the invention can also be obtained by a second process, characterised in that:

(1) anionic polymerisation of at least one monomer B is carried out with the aid of an initiating system consisting of at least one difunctional initiator and at least one ligand chosen from alkali or alkaline-earth metal salts, to obtain a living polymer $^-B^-$, then (2) the said polymer $^-B^-$ is reacted with at least one monomer A to form a living triblock copolymer $^-(A\text{-}B\text{-}A)^-$, and finally (3) the copolymer $^-(A\text{-}B\text{-}A)^-$ is reacted with at least one protolytic compound.

This second process can be implemented simply by placing the initiating system—consisting of the difunctional initiator and of the ligand—in a reactor and then successively introducing the monomer B and, after the stage of polymerisation of the latter, the monomer A, and finally by terminating the polymerisation by adding a protolytic compound.

The difunctional initiators employed in stage (1) may be especially compounds such as 1,4-dilithio-1,1,4,4-tetraphenylbutane, 1,4-disodio-1,1,4,4-tetraphenylbutane, naphthalenesodium and naphthalenelithium.

The particular aspects of obtaining the triblock copolymers according to the invention which are common to the first process and to the second process will now be described.

The duration of each polymerisation stage, which can vary depending on the nature of the monomer to be polymerised and on the polymerisation temperature which is chosen, is generally approximately between 3 and 150 minutes. The proportion of ligand employed in relation to the initiator can vary greatly, especially as a function of the nature of the ligand and of the nature of the initiator. This quantity may be, for example, greatly in excess in relation to the molar quantity of the initiating agent. This quantity may also be equal to or smaller than the molar quantity of the initiating agent. The ligand is preferably introduced in a molar proportion to the initiator which ranges approximately from 0.3 to 25 and preferably ranges approximately from 2 to 15.

The different polymerisation stages are preferably carried out in the absence of moisture and oxygen, and in the presence of at least one solvent chosen, preferably, from aromatic solvents such as benzene and toluene, or else tetrahydrofuran, diglyme, tetraglyme, ortho-terphenyl, biphenyl, decalin, tetralin or dimethylformamide. Finally, the polymerisation temperature, which may vary from one stage to the other, is generally approximately between −80° C. and +20° C. and may even go up to +60° C. when an alkali metal alcoholate is employed as ligand for the polymerisation of methyl methacrylate.

The triblock copolymers according to the invention, containing at least one acrylic or methacrylic acid block can be obtained by first preparing the triblock copolymer containing the corresponding (meth)acrylate block(s) of formula $CH_2=CR^1-CO_2R$—in which R is defined as above and $R^1$ is chosen from the hydrogen atom and the methyl radical—by either of the processes described above and by then hydrolysing the triblock copolymer thus prepared at a temperature ranging approximately from 70° to 170° C., at a pressure ranging from 1 to 15 bars and in the presence of approximately from 0.5 to 10% by weight, relative to the copolymer, of an acidic catalyst such as para-toluenesulphonic acid, methane toluenesulphonic acid or hydrochloric acid, in a polar solvent such as dioxane. After hydrolysis, the triblock copolymers containing acrylic and/or methacrylic acid blocks can be precipitated in heptane, filtered, washed to remove all traces of catalyst and finally dried. They can also be subsequently neutralised with methanolic potassium hydroxide or else with tetramethyl ammonium hydroxide in solution in a mixture of toluene and methanol, so as to form the corresponding triblock ionomers, containing at least one alkali (meth-)acrylate block.

When the polymerisation of a monomer block is found to be tricky, which may be the case especially with a primary alkyl acrylate block in the presence of some initiating systems, it is also possible first to prepare a triblock copolymer containing the corresponding block of another acrylate and then to subject it to a transesterification stage by any known method for this reaction.

The protolytic compound added a the end of the polymerisation stage of either of the processes described above, to terminate the polymerisation, may be chosen especially from water, alcohols, acids and amines.

Most of the triblock copolymers according to the invention exhibit remarkable properties. Thus, (acrylic-b-vinylaromatic-b-acrylic) copolymers have glass transition temperatures $T_g$ ranging from 100° to 110° C. (Acrylic acid-b-styrene-b-acrylic acid) copolymers show a glass transition temperature as high as 125° C., while (sodium acrylate-b-styrene-b-sodium acrylate) copolymers show a glass transition temperature as high as 160° C. Finally, (methyl methacrylate-alkyl or alkoxyalkyl acrylate-methyl methacrylate) copolymers containing from 50 to 85% by weight of acrylate have an elongation at break (determined according to ASTM standard D-1708) of at least 500% and/or a breaking stress of at least 4-MPa.

The following examples are given by way of illustration and do not limit the present invention.

In all these examples the exclusion chromatography was performed by employing a Waters GPC 501 apparatus equipped with two linear columns, with tetrahydrofuran as eluent at a flow rate of 1 ml/min. The number-average molecular masses were determined with a HP 502 membrane osmometer.

EXAMPLE 1

$7 \times 10^{-3}$ mol of lithium chloride, purified beforehand and stored in the absence of light, is introduced under a nitrogen atmosphere into a predried round bottom flask. 200 ml of predried tetrahydrofuran and $0.7 \times 10^{-3}$ mol of naphthalenelithium are added to it with stirring. The mixture is brought to a temperature of $-78°$ C. with a mixture of acetone and solid carbon dioxide and a solution of 5 g of tert-butyl acrylate in toluene is added, followed by a solution of 4 g of methyl methacrylate in toluene. The solvents and monomers are purified using techniques which are commonly employed in anionic polymerisation; in particular, the acrylate and the methacrylate are treated successively with calcium hydride and triethylaluminium. The polymerisation is terminated by adding a few milliliters of methanol. A triblock copolymer which has the following characteristics is obtained in a 98% yield:

| | |
|---|---|
| Mn (acrylate) | = 16,400 |
| Mn (methacrylate) | = 13,600 |
| Mw/Mn (total copolymer) | = 1.6 |

EXAMPLE 2

The experimental procedure of Example 1 is reproduced, the ingredients being modified as follows:

| | |
|---|---|
| naphthalenelithium | $1.05 \times 10^{-3}$ mol |
| lithium chloride | $10.5 \times 10^{-3}$ mol |
| tert-butyl acrylate | 35 g |
| methyl methacrylate | 13 g |
| tetrahydrofuran | 1000 ml |

In these conditions a triblock copolymer which has the following characteristics is obtained in a 99% yield:

| | |
|---|---|
| Mn (acrylate) | = 94,000 |
| Mn (methacrylate) | = 21,000 |
| Mw/Mn (total copolymer) | = 1.28 |

EXAMPLE 3

The experimental procedure of Example 1 is reproduced, the conditions and ingredients being modified as follows:

| | |
|---|---|
| 1,4-dilithio-1,1,4,4-tetraphenyl-butane | $0.5 \times 10^{-3}$ mol |
| lithium tert-butanolate | $5 \times 10^{-3}$ mol |
| methyl methacrylate | 4.7 g |
| 2-ethylhexyl acrylate | 8.8 g |

The polymerization period in the first stage is 30 minutes and that in the second stage 60 minutes.

In these conditions a triblock(acrylate-b-methacrylate-b-acrylate) copolymer which has the following characteristics is obtained in a 90% yield:

| | |
|---|---|
| $M_n$ (methacrylate) | = 36,000 |
| $M_n$ (acrylate) | = 32,000 |

| | |
|---|---|
| $M_w/M_n$ (total copolymer) | = 2.0 |

EXAMPLE 4

The experimental procedure of Example 1 is reproduced, the ingredients being modified as follows:

| | |
|---|---|
| diphenylmethylsodium (initiator) | $0.2 \times 10^{-3}$ mol |
| tetrahydrofuran | 30 ml |
| toluene | 120 ml |
| polymerisation temperature | $-20°$ C. |
| sodium tert-butanolate (ligand) | $1.2 \times 10^{-3}$ mol |
| tert-butyl acrylate | 4.5 g |
| methyl methacrylate | 5 g |

The polymerisation periods in the two stages are, successively, 5 and 30 minutes.

In these conditions a triblock copolymer which has the following characteristics is obtained in a 92% yield:

| | |
|---|---|
| Mn (acrylate) | = 32,500 |
| Mn (methacrylate) | = 8,000 |
| Mw/Mn (total copolymer) | = 1.75 |

EXAMPLE 5

The experimental procedure of Example 1 is reproduced, the ingredients being modified as follows:

| | |
|---|---|
| 1,4-dilithio-1,1,4,4-tetraphenyl-butane | $0.3 \times 10^{-3}$ mol |
| lithium chloride | $1.6 \times 10^{-3}$ mol |
| tetrahydrofuran | 1,500 ml |
| tert-butyl acrylate | 50 g |
| methyl methacrylate | 50 g |

In these conditions a triblock copolymer which has the following characteristics is obtained:

| | |
|---|---|
| Mn (acrylate) | = 150,000 |
| Mn (methacrylate) | = 90,000 |
| Mw/Mn (total copolymer) | = 1.2 |

EXAMPLE 6

Using the three-stage process described in the general part of the present description, and employing sec-butyllithium as monofunctional initiator and lithium chloride as ligand in a molar ratio of 10 in relation to the initiator, a triblock poly(styrene-b-n-butyl acrylate-b-methyl methacrylate) copolymer which has the following characteristics is prepared quantitatively:

| | |
|---|---|
| Mn (styrene) | = 24,000 |
| Mn (acrylate) | = 79,000 |
| Mn (methacrylate) | = 27,000 |

The elongation at break of this copolymer, determined from the stress-elongation curve for moulded samples at a traction speed of 2 cm/min is 560%.

EXAMPLE 7

The experimental procedure of Example 1 is reproduced, except that styrene, which is introduced first, replaces the acrylate and that tert-butyl acrylate, which is introduced second, replaces methyl methacrylate. The ingredients are modified as follows:

| | |
|---|---|
| naphthalenelithium | $0.25 \times 10^{-3}$ mol |
| lithium chloride | $1.25 \times 10^{-3}$ mol |
| tert-butyl acrylate | 19 g |
| styrene | 5 g |

The polymerisation periods in the two stages are, successively, 30 minutes and 15 minutes.

In these conditions, a triblock copolymer which has the following characteristics is obtained in a 100% yield:

| | | |
|---|---|---|
| Mn (styrene) | = | 36,000 |
| Mn (tert-butyl acrylate) | = | 109,000 |
| Mw/Mn (total copolymer) | = | 1.13 |

EXAMPLE 8

The experimental procedure of Example 7 is reproduced, the ingredients being modified as follows:

| | |
|---|---|
| naphthalenelithium | $0.44 \times 10^{-3}$ mol |
| lithium chloride | $2.2 \times 10^{-3}$ mol |
| tert-butyl acrylate | 0.3 g |
| styrene | 5 g |

In these conditions a triblock copolymer which has the following characteristics is obtained in a 100% yield:

| | | |
|---|---|---|
| Mn (styrene) | = | 23,000 |
| Mn (tert-butyl acrylate) | = | 1,500 |
| Mw/Mn (total copolymer) | = | 1.10 |
| Tg | = | 104° C. |

EXAMPLES 9 TO 14

By following the experimental procedure of Examples 7 and 8 and adjusting the quantities of the ingredients, the molar ratio of lithium chloride to naphthalenelithium being always equal to 5, the triblock (tert-butyl acrylate-b-styrene-b-tert-butyl acrylate) copolymers whose characteristics appear in Table I below are prepared.

TABLE I

| Example | $M_n$ (styrene) | $M_n$ (acrylate) | $M_w/M_n$ | Tg (°C.) |
|---|---|---|---|---|
| 9 | 26,000 | 56,000 | 1.2 | 107 |
| 10 | 90,000 | 16,000 | 1.2 | 107.5 |
| 11 | 89,200 | 10,800 | 1.2 | 107 |
| 12 | 92,800 | 2,600 | 1.2 | 107.5 |
| 13 | 23,800 | 1,200 | 1.2 | 104 |
| 14 | 34,400 | 600 | 1.15 | 104 |

EXAMPLES 15 TO 17

The triblock copolymers of Examples 9 to 11 respectively are dissolved in 20 times their weight of toluene. The solution, to which para-toluenesulphonic acid is added in a proportion of 5 mol % relative to tert-butyl acrylate, is heated to 100° C. for 8 hours. The hydrolysed copolymers obtained are then precipitated in heptane, filtered, washed a number of times to remove all traces of catalyst, and are then dried in benzene. The degree of hydrolysis was determined by acid-base potentiometric titration in a mixture containing 90% of toluene and 10% of methanol. The measured degrees of hydrolysis are, respectively, 100% (Example 15), 97.5% (Example 16) and 96% (Example 17).

EXAMPLE 18

By following the experimental procedure of Example 1, the initiator being a mixture of naphthalene and alpha-methylstyryllithium and the ligand lithium chloride in a molar ration of 10 relative to the initiator, the initial temperature being −70° C. to reach −55° C. during the second polymerisation stage, a (methyl methacrylate-b-tert-butyl acrylate-b-methyl methacrylate) copolymer which has the following characteristics is prepared in a 100% yield:

| | | |
|---|---|---|
| Mn (acrylate) | = | 83,200 |
| Mn (methacrylate) | = | 13,300 |
| Mw/Mn (total copolymer) | = | 1.3 |

EXAMPLE 19

The copolymer of Example 18 is dissolved in 4.5 times its weight of toluene. Para-toluenesulphonic acid is added to this solution in a proportion of 5 mol % relative to tert-butyl acrylate, followed by methoxyethanol in a molar ratio of 3 relative to tert-butyl acrylate. The mixture is then heated to 100° C. for 24 hours. The (methyl methacrylate-b-methoxyethyl acrylate-b-methyl methacrylate) copolymer obtained is then precipitated twice in a mixture of 80 parts of methanol and 20 parts of water and stabilised with an antioxidant. A sample of this copolymer is then calendered for 10 minutes at 120° C. and then compression-moulded at 150 bars for 10 minutes at 120° C. The elongation at break measured on this sample according to ASTM standard D-1708 is 710%.

EXAMPLE 20

By following the experimental procedure of Example 18, except for the initial temperature (−66° C.) and that of the second polymerisation stage (−47° C.), a (methyl methacrylate-b-tert-butyl acrylate-b-methyl methacrylate) copolymer which has the following characteristics is prepared in a 100% yield:

| | | |
|---|---|---|
| Mn (acrylate) | = | 61,800 |
| Mn (methacrylate) | = | 39,900 |
| Mw/Mn (total copolymer) | = | 1.4 |

EXAMPLES 21 AND 22

The copolymer of Example 20 is subjected to the transesterification process of Example 19, the alcohol being n-butanol (Example 21) or else methoxyethanol (Example 22). The elongation at break is measured on samples which are calendered and then compression-moulded as in Example 19. Its value is:

4.3 MPa in the case of Example 21, and
6.7 MPa in the case of Example 22.

EXAMPLE 23

By following the experimental procedure of Example 1 and successively introducing tert-butyl acrylate and N-cyclohexylmaleimide, the block copolymerisation of these monomers is carried out at −78° C. (the length of each stage being 15 and 120 minutes respectively), in the following conditions:

| | | |
|---|---|---|
| naphthalenelithium | = | $2.5 \times 10^{-3}$ mol |
| lithium chloride | = | $2.5 \times 10^{-2}$ mol |
| tert-butyl acrylate | = | 5.3 g |
| N-cyclohexylmaleimide | = | 4.5 g |
| tetrahydrofuran | = | 100 ml |

The characteristics of the triblock polymer obtained appear in Table II below.

EXAMPLE 24

The experimental procedure of Example 23 is reproduced, only naphthalenelithium being replaced with $3.4 \times 10^{-3}$ mol of naphthalenesodium. The characteristics of the triblock polymer obtained appear in Table II below.

EXAMPLE 25

The experimental procedure of Example 23 is reproduced, the proportions of the ingredients being modified as follows:

| | | |
|---|---|---|
| naphthalenelithium | = | $0.5 \times 10^{-3}$ mol |
| lithium chloride | = | $0.5 \times 10^{-2}$ mol |
| tert-butyl acrylate | = | 4.5 g |
| N-cyclohexylmaleimide | = | 5.0 g |
| tetrahydrofuran | = | 100 ml |

The characteristics of the triblock polymer obtained appear in Table II below.

EXAMPLE 26

The experimental procedure of Example 25 is reproduced, only naphthalenelithium being replaced with the same quantity of naphthalenesodium. The characteristics of the triblock copolymer obtained appear in Table II below.

TABLE II

| Example | 23 | 24 | 25 | 26 |
|---|---|---|---|---|
| yield (%) | 100 | 89 | 93 | 85 |
| Mn (acrylate) | 4,900 | 2,800 | 33,000 | 48,000 |
| Mn (maleimide) | 2,300 | 1,100 | 17,000 | 14,000 |
| Mw/Mn (total copolymer) | 1.23 | 1.26 | 1.18 | 1.21 |

We claim:

1. A triblock copolymer comprising:
a copolymer which has a number-average molecular weight ranging from 3,000 to 300,000 and a molecular weight polydispersity ranging from 1.05 to 2.0, and an A-B-C structure in which each of the blocks A and C denotes a monomer sequence chosen from an acrylic, a vinylaromatic, a methacrylic or a maleimide monomer, block B denotes a monomer sequence chosen from an acrylic, a vinylaromatic or a methacrylic monomer, wherein at least one of the blocks A and C is different than block B.

2. A triblock copolymer according to claim 1, wherein blocks A and C are of identical types of monomer sequences.

3. A triblock copolymer according to claim 2, wherein block B represents from 10 to 99% by weight of the total copolymer.

4. A triblock copolymer according to claim 3, wherein block B is an acrylic monomer sequence, block A is a methacrylic monomer sequence and block B represents from 50 to 85% by weight of the total copolymer.

5. A method of using a triblock copolymer according to claim 4 for the manufacture of elastomeric articles.

6. Process for the preparation of a triblock copolymer according to claim 1, comprising:
   (1) conducting an anionic polymerisation of at least one monomer A with the aid of an initiating system of (i) at least one monofunctional initiator of formulas:

$$(R)_p-M \qquad (I)$$

in which:
M denotes an alkali or alkaline-earth metal,
P denotes the valency of the metal M, and
R denotes a straight- or branched-chain alkyl radical containing 2 to 6 carbon atoms, or an alkyl radical containing 1 to 6 carbon atoms, substituted by at least one phenyl group, and
   (ii) at least one ligand of alkali or alkaline-earth metal salts, to obtain a living chain unit A−, then
   (2) reacting said living chain unit A− with at least one monomer B to obtain a living diblock copolymer (A-B)−, then
   (3) reacting said copolymer (A-B)− with at least one monomer C to form a living triblock copolymer (A-B-C)−, and finally
   (4) reacting the copolymer (A-B-C)− with at least one protolytic compound
whereby a triblock copolymer according to claim 1 is produced.

7. Process for the preparation of a triblock copolymer according to claim 2, comprising:
   (1) conducting the anionic polymerisation of at least one monomer B with the aid of an initiating system of at least one difunctional initiator and at least one ligand of alkali or alkaline-earth metal salts, to obtain a living polymer −B−, then
   (2) reacting said polymer −B− with at least one monomer A to form a living triblock copolymer −(A-B-A)−, and finally
   (3) reacting the copolymer −(A-B-A)− with at least one protolytic compound
whereby a triblock copolymer according to claim 2 is produced.

8. Process according to either claim 6 or claim 7, wherein the ligand is employed in a molar ratio ranging from 0.3 up to 15 to the initiator.

9. Process according to one of claims 6 to 8, wherein the polymerisation takes place in the presence of at least one solvent.

10. Process according to claims 6 to 9, wherein the polymerisation takes place at a temperature of −78° C. to +20° C.

* * * * *

UNITED STATES PATENT AND TRADEMARK OFFICE
CERTIFICATE OF CORRECTION

PATENT NO. : 5,264,527
DATED : November 23, 1993
INVENTOR(S) : Sunil K. Varshney, Roger Fayt, Philippe Teyssie, Jean-Paul Hautekeer It is certified that error appears in the above-indentified patent and that said Letters Patent is hereby corrected as shown below:

Claim 6, column 12, lines 20-21, "formulas" should read --formula--.

Signed and Sealed this

Twenty-second Day of February, 1994

*Attest:*

BRUCE LEHMAN

*Attesting Officer*   *Commissioner of Patents and Trademarks*